United States Patent [19]
Horne

[11] Patent Number: 6,134,263
[45] Date of Patent: *Oct. 17, 2000

[54] METHOD FOR USING SPREADING CODE SEQUENCY TO ACHIEVE HIGH BIT DENSITIES IN A DIRECT-SEQUENCE SPREAD SPECTRUM COMMUNICATION SYSTEM

[75] Inventor: David M. Horne, Chandler, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/002,646

[22] Filed: Jan. 5, 1998

[51] Int. Cl.$^7$ .................................................. H04B 1/707

[52] U.S. Cl. ............................................................. 375/146

[58] Field of Search .................................... 375/200, 206, 375/208

[56] References Cited

U.S. PATENT DOCUMENTS

| | | | |
|---|---|---|---|
| 4,308,617 | 12/1981 | German, Jr. ............................. | 375/208 |
| 5,144,641 | 9/1992 | Akazawa ................................. | 375/208 |
| 5,276,705 | 1/1994 | Higgins .................................. | 375/208 |
| 5,315,616 | 5/1994 | Delisle et al. ......................... | 375/208 |
| 5,469,470 | 11/1995 | Takahashi .............................. | 375/208 |
| 5,712,869 | 1/1998 | Lee et al. ................................ | 375/208 |

*Primary Examiner*—Temesghen Ghebretinsae
*Attorney, Agent, or Firm*—Meredith M. McKenzie

[57] ABSTRACT

A method for achieving high bit densities in a direct-sequence spread spectrum communication system. The first step is to create a first pseudo-noise code with a given sequency value. The information signal is then spread by modulating the information signal with the pseudo-noise code where the pseudo-noise code used has a sequency value equal to that of the value of the signal. The information signal is then despread and the value of the information signal is determined by the sequency value of the pseudo-noise code used to demodulate the signal.

7 Claims, 3 Drawing Sheets

METHOD FOR USING SPREADING CODE SEQUENCY TO ACHIEVE HIGH BIT DENSITIES IN A DIRECT-SEQUENCE SPREAD SPECTRUM COMMUNICATION SYSTEM

FIELD OF THE INVENTION

The present invention relates to the field of data communications. More particularly the invention describes a method of using spreading code sequency to achieve high bit densities in direct sequence spread spectrum communication systems.

BACKGROUND OF THE INVENTION

Direct Sequence Spread Spectrum (DSSS) techniques rely on the use of pseudo-noise carriers, also called spreading codes, spreading sequences, code sequences and chip sequences, and a transmission bandwidth which is much wider than the minimum required to transmit the information. The transmitter spreads the information by modulating the information with a pseudo-noise spreading sequence. At the receiver, the information is despread to recover the base information. This despreading is accomplished by correlating the received, spread-modulated, signal with the spreading sequence used for the transmission. DSSS is sometimes referred to by the shorthand name "direct spread."

The modulating signal, such as a pseudo-random spreading code signal, possesses a chip rate (analogous to carrier frequency) which is much larger than the data rate of the information signal. This characteristic is required for efficient spreading. Each state of the pseudo-random spreading sequence is referred to as a chip. The spreading sequence (chip sequence) directly modulates each bit of the information signal, hence the name direct spread. Pseudo-randomness of the spreading signal is required in order to recover the original information signal. Since the spreading sequence is deterministic, it can be exactly duplicated at the receiver in order to extract the information signal. If it were truly random, extraction of the information signal via correlation receiver would not be possible.

The spreading operation causes the signal power to be depleted uniformly across the spread bandwidth. Thus, the spread spectrum signal will appear buried in noise to any receiver without the despreading signal. Consequently, it is not only difficult to jam, but is also difficult to detect its presence in any bandwidth. Any undesired signal picked up during transmission is spread by the receiver in the same way that the transmitter spread the desired signal originally. In other words, the receiver spreads undesired signals picked up during transmission, while simultaneously despreading, or demodulating, the desired information signal. Processing gain is the term used to express this interference suppression in the overall transmit/receive operation. When viewed as a transmit/receive operation, the desired signal is spread-modulated twice, giving back the original signal, while in-band interference is spread-modulated once, and thereby depleted across the full spread bandwidth.

SUMMARY OF THE INVENTION

A method for achieving high bit densities in a direct-sequence spread spectrum communication system. The first step is to create a first pseudo-noise code with a given sequency value. The information signal is then spread by modulating the information signal with the pseudo-noise code where the pseudo-noise code used has a sequency value equal to that of the value of the signal. The information signal is then despread and the value of the information signal is determined by the sequency value of the pseudo-noise code used to demodulate the signal.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

The disclosed technique utilizes a previously unexploited method to embed multi-bit information into the spreading code via the row sequency of an ordered Hadamard kernel of order $2^n$. In this manner, the excess bandwidth inherent to spread spectrum modulation is exploited for an information capacity increase, without sacrificing benefits of spread spectrum techniques. This information capacity increase is achieved without any accompanying increase in the transmit power or bandwidth.

An ordered Hadamard Transform kernel is used to generate a matrix of spreading codes with embedded capacity properties. The application of the row sequency and row arrangement properties of this matrix to embed additional information into the constituent spreading codes is unique to the spread spectrum application. Sequency is defined as the number of state changes within a given vector. For example, the vector '0011110101' has a sequency of five.

The standard Hadamard kernel of order $2^n$ is commonly used to formulate a set of orthogonal spreading codes for spread spectrum modulation. The resultant square matrix is analogous to the Walsh kernel of the same order, with a different row arrangement. The Hadamard matrix, however, can be arrived at through simple recursion of the second-order Hadamard kernel.

In standard form, the resultant Hadamard matrix is orthogonal and data-symmetric (row n is identical to column n). However, neither the arrangement of the rows nor the row sequency is specifically utilized in spread spectrum applications. Each row vector in the standard matrix is used independently as a spreading code.

The ordered Hadamard kernel generates a square matrix which, in addition to being orthogonal, is sequency-symmetric, i.e. the sequency of row n equals the integers from 0 to the kernel order minus one, and the sequency of any given row corresponds to the row number. Thus, there is a natural mapping of user data to row sequency for a spread spectrum system which utilizes the ordered Hadamard matrix as the spreading code look-up table. This allows a data-dependent spreading code to be used as the modulating signal each symbol period. The number of embedded bits representable by any row of an ordered Hadamard kernel of order $2^n$ is equal to the log-base-2 of the spreading code length. Implementation is relatively simple, and the underlying benefits of spread spectrum techniques are preserved.

Figure 1A:
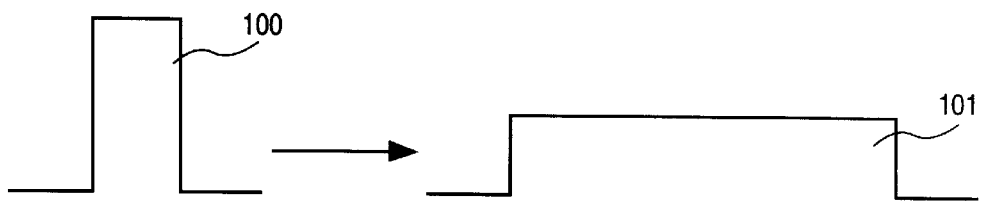
FIG. 1(a) is a diagram showing a signal being spread.
Figure 1B:
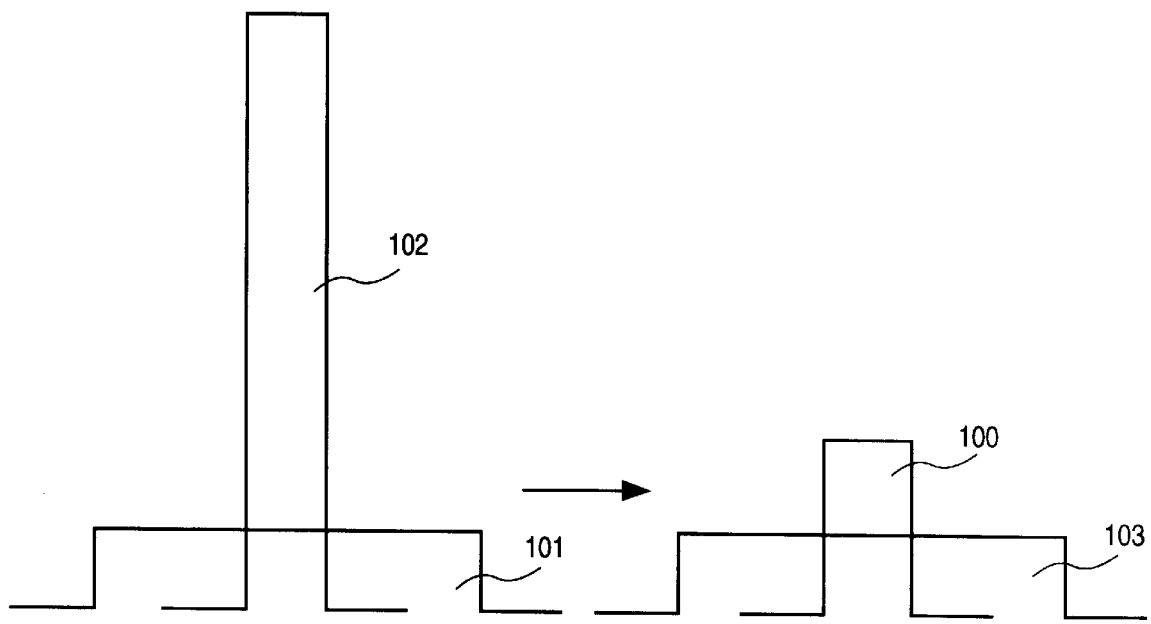
FIG. 1(b) is a diagram showing a spread signal with interference being demodulated into the original signal and noise.

FIG. 1(a) shows an example of what occurs to a signal when it is spread. Signal 100 is spread using a spreading sequence (not shown) into signal 101. As can be seen, the amplitude of the signal is decreased, while its bandwidth is expanded. By reducing the amplitude, the signal will appear indistinguishable from noise, and can only be recovered by a receiver which processes the correct spreading sequence. FIG. 1(b) shows the spread signal 101 and an interference signal 102 which has been picked up during transmission. When the spread modulated signal 101 is demodulated by using the original spreading sequence (not shown), the original signal 100 is recovered and the interference signal 102 is spread into signal 103, thereby being reduced to noise.

Figure 2A:
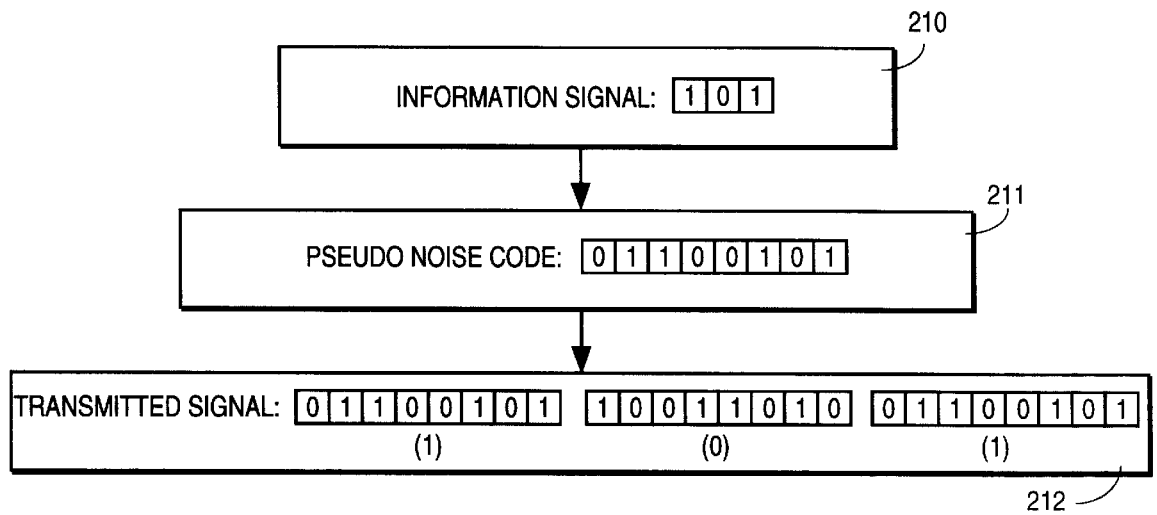
FIG. 2(a) is an exemplary prior art method of spreading signals.

FIG. 2(a) is a diagram of an exemplary prior art method of spreading a signal. An information signal 210 is modulated, using known methods, by a pseudo-noise code 211. For each '1' in the information signal, the pseudo-noise code 211 is transmitted. Whereas for each '0' in the information signal, the inverse of the pseudo-noise code 211 is transmitted. Thus, through such modulation, the signal is spread out for transmission into the transmitted signal 212. For example, if the information signal 210 consists of the bits '101' and the pseudo-noise code 211 is '01100101' then the transmitted signal 212 is '01100101 10011010 01100101.' This transmitted signal is created by '1' corresponding to the pseudo-noise code 211 ('01100101') and '0' corresponding to the inverse of the pseudo-noise code ('10011010').

Figure 2B:
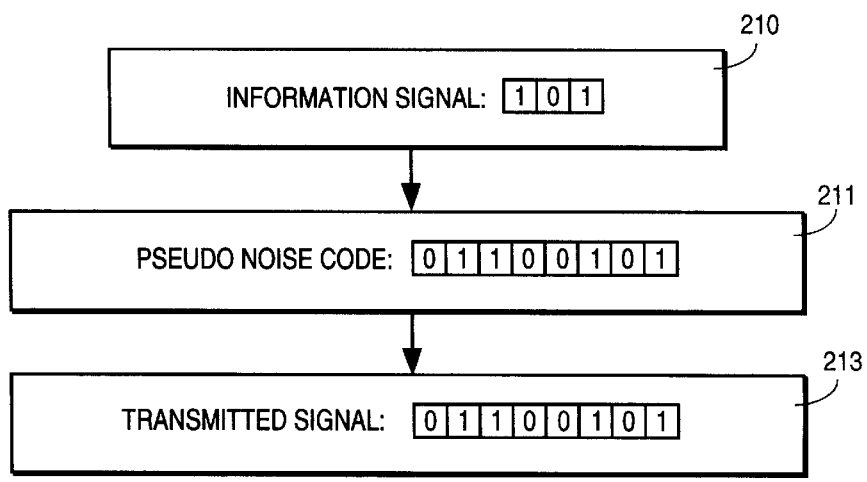
FIG. 2(b) is an exemplary method of spreading signals using code sequency.

FIG. 2(b) is a diagram of an exemplary method of spreading a signal using the sequency of a pseudo-noise code. As described above, the information signal 210 is again modulated by a spreading signal to create a transmitted signal 214. However, in this case, the sequency of the pseudo-noise code is used in order to allow multiple bits of information to be transmitted per each pseudo-noise code instead of a single bit, as described above. The pseudo-noise code's sequency corresponds to the value of the information signal being sent. Therefore, if two bits of information are to be sent per each pseudo-noise code, a four bit pseudo-noise code is necessary. This is because the sequency of a four bit pseudo-noise code ranges from zero to three. Similarly, two bits of information have a value ranging from zero to three. Therefore, if the value of the information bits is 3 (the bits are '11'), then the pseudonoise code with a sequency of three is used. For example, in FIG. 2(b), the same information signal 210 ('101') and pseudo-noise code 211 ('01100101') of FIG. 2(a) is used. In this case, a binary '101' equals a numeric 5 and the corresponding pseudo-noise code '01100101,' has a sequency of 5. Thus, the transmitted signal 213 need only be '01100101' in order to transmit the information signal '101.'

Figures 3A, 3B:
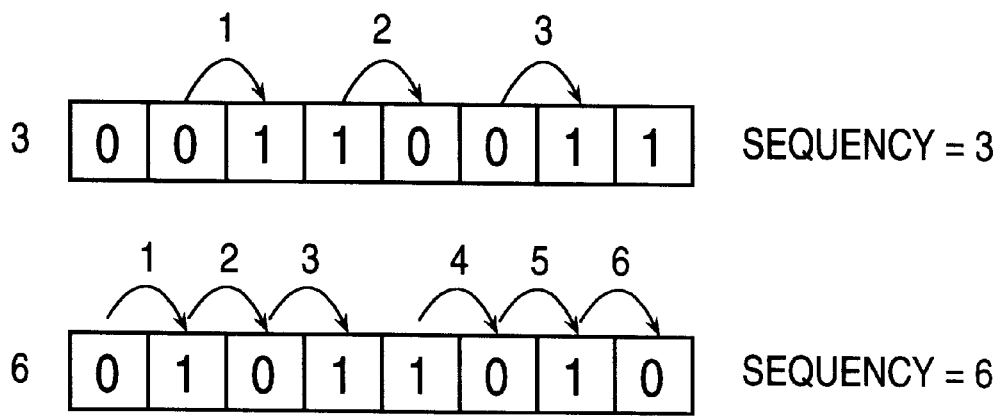
FIG. 3(a) is an exemplary ordered Hadamard table.
FIG. 3(b) shows the method of determining the sequency of the pseudo-noise code.

FIG. 3(a) shows an ordered Hadamard table 300. In an ordered Hadamard table, the rows and the columns are symmetrical and orthogonal. Thus, row 4 is the same as column 4. As can be seen, row 0 contains '00000000' and has a sequency of 0. Similarly, row 1, containing '00001111', has a sequency of 1. FIG. 3(b) shows two entries from the Hadamard table: row 3 and row 6. Row 3 contains '00110011.' In this row, there is a sequency of three, this is because there are three state transitions. More specifically, bit 7 is a '0' and bit 6 is a '0' therefore, there is no state change. Bit 6 is a '0' and bit 5 is a '1' therefore, there is a state change. Continuing in this manner, there are three state changes, therefore, this pseudo-noise code has a sequency of three.

What is claimed is:

1. A method for achieving high bit densities in a direct-sequence spread spectrum communication system the method comprising the steps of:

creating a first pseudo-noise code with a first sequency, the first sequency of the first pseudo-noise code corresponds to the value of a first information signal and transmitting the first pseudo-noise code.

2. The method of claim 1 further comprising the steps of:

creating a second pseudo-noise code with a second sequency;

spreading a second information signal by modulating the second information signal with the second pseudo-noise code.

3. The method of claim 2 wherein the first pseudo-noise code and the second-pseudo noise codes are orthogonal.

4. The method of claim 2 wherein the first pseudo-noise code and the second pseudo-noise code have different sequency.

5. The method of claim 1 further comprising the steps of:

creating a second pseudo-noise code with a second sequency;

storing the first pseudo-noise code and the second pseudo-noise codes in a table;

spreading a second information signal with the second pseudo-noise code.

6. The method of claim 5 wherein the value of the first information signal corresponds to the sequency of the first psuedo-noise code and the value of the second information signal corresponds to the sequency of the second psuedo-noise code.

7. The method of claim 1 wherein a single pseudo-noise code transmits multiple bits of information signal.

\* \* \* \* \*